No. 871,989. PATENTED NOV. 26, 1907.
J. W. GATES.
ANIMAL TRAP.
APPLICATION FILED MAR. 20, 1907.
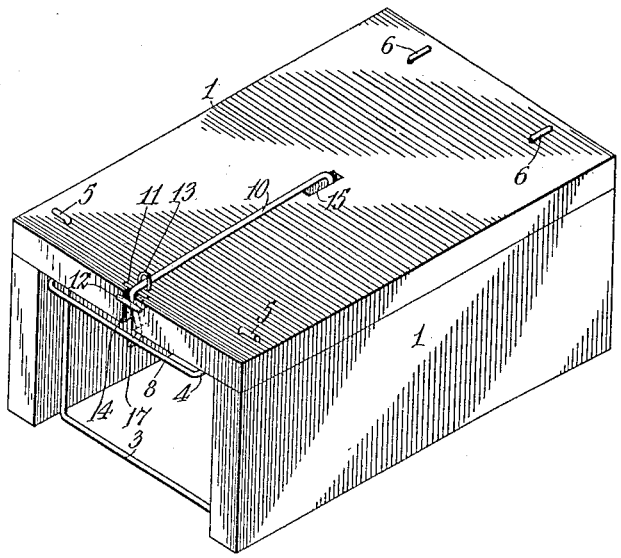
Witnesses:
Inventor;
John W. Gates.
By Townsend, Lyon, Hackley & Knight
his Attorneys

UNITED STATES PATENT OFFICE.

JOHN W. GATES, OF LOS ANGELES, CALIFORNIA.

ANIMAL-TRAP.

No. 871,989.  Specification of Letters Patent.  Patented Nov. 26, 1907.

Application filed March 20, 1907. Serial No. 363,518.

*To all whom it may concern:*

Be it known that I, JOHN W. GATES, a citizen of the United States, residing at Los Angeles, in the county of Los Angeles and State of California, have invented a new and useful Animal-Trap, of which the following is a specification.

This invention relates to the class of animal traps known as box traps, and the main object of the invention is to provide a box trap wherein all the working parts shall be substantially inclosed within the box so that there are no parts projecting from the box. The advantage of such construction is that it is easier to handle, more compact in storing and shipping, and less liable to damage in storing and shipping. Furthermore, in the use of the box trap an advantage arises from the absence of projecting parts on the top thereof in that the box can be pushed into a hole any desired distance and the pressure of the ground on the top thereof does not interfere with the action of the springs.

Another object of the invention is to provide an animal trap of this character in which the impact of the trap jaw on the animal will draw it into the trap rather than push it away therefrom.

In the accompanying drawings:—Figure 1 is a perspective of the trap in open set position. Fig. 2 is an inverted plan thereof. Fig. 3 is a longitudinal section of the trap in open position, showing in dotted lines the sprung position. Fig. 4 is a perspective of the catch. Fig. 5 is a longitudinal section of another form of the invention.

1 designates the box of the trap which is of usual form, being open at the bottom and in front, and closed at the top, sides and rear with the exception of the usual perforation 2, if desired. Across the front of the box near the lower edge thereof extends a cross member 3 which forms an abutment for the working jaw, said member being preferably formed of a wire shaped as a bail having its upper ends clenched in the top of the box at 5 and extending downwardly therefrom and then across the open bottom of the box.

The working jaw 4 of the trap consists preferably of a U-shaped spring formed, for example, of wire having its ends clenched in the top of the trap at 6, then bent downwardly and around to form a coil 7 at each end, extending forwardly therefrom and then across the box to form a cross piece 8 parallel to the fixed cross member 3, the parts being of such form and location that when the spring is released the side bars of the U-shaped member 4 will strike or rest on the cross member 3 and the jaw member 8 will extend somewhat in front of the cross member 3 so that it can be grasped by the fingers to pull it to raised position shown in full lines in Fig. 3. Said jaw member is held in such raised position by means of a catch 10 which works on a fulcrum or pivot 11 formed, for example, as a staple driven into the top of the box, said catch being guided by other staples 12, 13 and by a slot 14 in the front of the box in which the catch works. Said catch extends downwardly and somewhat rearwardly from the pivot and has at its lower end a hook 17 engaging under the cross member 8 of the spring jaw of the trap and the other arm of the catch extends rearwardly over the top of the box and downwardly through a slot 15 in said top, being provided at its lower end with an enlargement or ring 16 to be operated as a trigger by the animal.

The catch member 10 consists of a single piece of wire, bent to form the arms which serve as the hook and the trigger. The trigger portion of the catch extends in the rear of the path of the spring jaw member, so that as the animal enters the box it directly engages the trigger to operate the catch.

The operation is as follows:—The spring jaw member 4 is drawn upwardly by the hand until the cross member 8 catches in the hook of the catch, the box being so held that the catch will allow it to pass into position over the hook and the catch itself being, if desired, beveled to facilitate such passage. The point of engagement on the hook being rearward of the fulcrum, with reference to the line of motion of the spring jaw, it follows that the pressure of the spring jaw on the catch tends to hold the rear arm of the catch down so that there is no possibility of accidental displacement of the catch. The trap is then placed in the hole, and when the gopher or other animal enters the trap and touches the enlargement or rear end of the catch, the hook at the forward end of the catch is caused to move rearwardly and to release the spring jaw member 4 which moves toward the dotted line position and catches the animal between the cross members 8, 3. The rear end of the spring jaw member is above the cross member 3 so that in the movement of the spring jaw member downwardly onto the cross member the cross bar 8 of the spring jaw has an inward or rearward movement in distinction to the outward or forward movement of those spring jaws which normally extend upwardly and forwardly from the rear of the box. This inward and downward movement tends to draw the animal into the trap, whereas an outward and forward movement would tend to throw him from the trap, and, in case he had only slightly entered, would release him from the trap.

The catch being on the outside of the box indicates whether the trap is sprung, the catch being loose when the trap is sprung and tight when it is set. The catch may, however, be located within the box, as shown at 18 in Fig. 5, if such indication is not desired, and if complete inclosure of the parts is desired.

What I claim is:—

1. An animal trap comprising a box open at the front and bottom, a cross member at the bottom of the box near the open end thereof, a spring jaw member working between the upper portion of the box and said cross member, and a catch fulcrumed on the upper portion of the box and consisting of a single piece of wire bent to form a downwardly extending arm formed with a hook to engage the jaw member and provided with an arm extending rearwardly and downwardly to serve as a trigger said trigger extending in the box rearwardly of the path of the jaw member to be operated as a trigger by direct engagement of the animal therewith.

2. A trap comprising a box open at the front and bottom, a cross member at the bottom of the box near the open end thereof, a spring jaw member working between the upper portion of the box and said cross member, a fulcrum at the upper portion of the box, and a catch formed as a unitary member supported on said fulcrum and having one arm to engage the spring jaw member and another arm extending rearwardly and downwardly at the rear of the path of the spring jaw member to be engaged by the animal in entering the box to serve as a trigger.

3. A trap comprising a box open at the front and bottom, a cross member at the bottom of the box near the open end thereof, a spring jaw member working between the upper portion of the box and said cross member, a catch fulcrumed on the top of the box and having a downwardly and rearwardly extending arm formed with a hook to engage the jaw member and provided with an arm extending rearwardly over the top of the box and downwardly through the top of the box to serve as a trigger.

4. A trap comprising a box open at the front and bottom and having a notch in its forward end and a fulcrum at said notch, a unitary catch member entering said notch and passing over said fulcrum, said catch member having a downwardly extending portion formed with a hook and a rearwardly and downwardly extending portion to serve as a trigger, a cross member at the bottom of the box, and a spring jaw working between the upper portion of the box and said cross member and adapted to be engaged by said hook on the catch.

5. A trap comprising a box open at the front and bottom, a cross member at the bottom of the box near the open end thereof, a spring jaw member working between the upper portion of the box and said cross member, a fulcrum at the upper portion of the box, and a catch formed as a unitary member supported on said fulcrum and having one arm to engage the spring jaw member and another arm extending rearwardly and downwardly at the rear of the path of the spring jaw member to be engaged by the animal in entering the box to serve as a trigger, the trigger having an enlarged end.

In testimony whereof, I have hereunto set my hand at Los Angeles, California, this 11th day of March 1907.

JOHN W. GATES.

In presence of—
ARTHUR P. KNIGHT,
FRANK L. A. GRAHAM.